United States Patent [19]

Seehase

[11] 3,920,335

[45] Nov. 18, 1975

[54] OPTICAL COLLIMATION GAGE

[76] Inventor: Jack C. Seehase, 1200 Osceola Ave., Winter Park, Fla. 32789

[22] Filed: July 19, 1974

[21] Appl. No.: 490,130

[52] U.S. Cl. .................. 356/138; 33/234; 33/286; 356/111; 356/153; 356/241
[51] Int. Cl.² ........................................ G01B 11/26
[58] Field of Search ...... 33/234, 286; 356/110, 111, 356/138, 153, 241

[56] References Cited
UNITED STATES PATENTS

| | | | |
|---|---|---|---|
| 1,564,432 | 12/1925 | Marcose et al. | 33/234 |
| 2,466,698 | 4/1949 | Getler | 33/234 |
| 3,423,154 | 1/1969 | Weber | 356/241 |

*Primary Examiner*—Paul A. Sacher
*Assistant Examiner*—Richard A. Rosenberger
*Attorney, Agent, or Firm*—Julian C. Renfro, Esquire

[57] ABSTRACT

An optical collimation gaging device for visually determining the degree and location of misalignments of barrels of shotguns, rifles and similar devices that may be used by unskilled individuals. A preferred embodiment of the optical gage utilizes a first short cylindrical plug that is inserted in the muzzle of a barrel and is dimensioned to form a snug fit therein. The muzzle plug has a small circular hole through its length that is concentric with its cylindrical body, said hole acting as a point source of light at its inside end when light falls on its outer end. A second short cylindrical shell-like plug is utilized by inserting said plug in the breech opening of such barrel, said plug having a capped outer end with a small circular aperture in its exact center and concentric with its cylindrical shell. The second plug is used as a viewing device such that the user's eye may be held in accurate alignment with the center line of the barrel. Due to the reflection of light rays from the point source of light at the muzzle along the polished inner surface of the barrel, a phenomenon consisting of circular rings of light will appear at discrete points along the barrel and can be observed through the breech plug aperture. The degree of straightness of the barrel and locations of any bends present may be judged by interpreting the departure from concentricity and evenness of the ring images.

12 Claims, 9 Drawing Figures

OPTICAL COLLIMATION GAGE

BACKGROUND OF THE INVENTION

This invention relates generally to gun barrels, precision tubes and the like and more particularly to optical gaging apparatus and methods for measuring the straightness of such gun barrels, precision tubes and the like.

In the manufacture of barrels for shotguns, rifles and similar weapons, it is very difficult to produce a barrel whose bore is perfectly straight and in line. Even when a new barrel is accurately aligned, normal stresses set up in the metal during manufacture may subsequently cause departures from such alignment. While these alignments are typically very slight, they can significantly affect the accuracy of shooting.

For example, in shotguns utilized in such sport activity as trap shooting, skeet shooting, hunting and the like, the pattern of the shot will be affected by a misaligned or slightly bent barrel. By straightening such barrels the accuracy of the gun will, of course, be increased. It has been found that even highly skilled shooters invariably achieve higher scores after proper straightening of their gun barrels.

With present mass production processes, gun manufacturers offer for sale many very attractive shotguns but a large proportion of the barrels are not sufficiently straight. For example, over the part year, I have examined and measured the straightness of over 2100 new shotguns. Of this number, approximately 80% were considered to be misaligned to an extent that would significantly affect the accuracy of the gun; about 15% were good and about 5% were excellent. It can therefore be seen that a buyer of a gun from a gun shop has a high probability of picking a poorly aligned barrel unless he is able to check the barrel before purchase.

The basic problem is the detection of an out of alignment condition. The same problem exists when a barrel is being straightened by a gunsmith. He must be able to determine when adequate alignment is obtained. In the industry some highly skilled and experienced gunsmiths can, by individual judgment, determine the straightness of a barrel by holding it up to a light and interpreting the faint highlights that may be reflected on the inside wall of the barrel. This is a relatively crude method and is obviously limited in accuracy. There are of course mechanical gages which may be used to make quantitative measurements. However, extremely accurate and expensive jigs or the like must be used and are not usable during a straightening operation. Either of these approaches is beyond the reach of the average sportsman or gun owner. While my invention is primarily concerned with gun barrels, there are many devices in existence in the technology that require extremely straight precision tubes and the like for which a means to detect and measure the degree of straightness is very useful.

SUMMARY OF THIS INVENTION

My invention provides a unique device that can be used by an unskilled individual to determine within extremely close limits the alignment or straightness of a gun barrel, or similar tube-like device. A basic implementation of my invention for use with gun barrels comprises a plug-like cylinder having a small circular concentric hole or aperture longitudinally through its exact center. The length of this plug is not critical although it must be short compared to the length of the barrel. The outer surface of one end of the plug is accurately turned to fit snugly into the sight end or muzzle of the barrel. A knurled shoulder at the other end of the plug provides a seat for the barrel end and a convenient grip for handling.

This plug is used either alone or in combination with an eye piece comprising a second plug also having a generally cylindrical shape of shell-like construction and having a shoulder on one end. This second plug also includes a small circular aperture hole in the shoulder end concentric to the cylinder. The cylindrical body of the plug has an outer diameter such as to fit snugly into the breech of the gun barrel against the shoulder. The combination of the front and rear plugs when inserted as described in a gun barrel forms a unique optical collimation gaging device.

In operation, the user places his eye at the aperture in the breech plug. The aperture in the muzzle plug constitutes a point source of light much in the manner of a pinhole camera lens. By holding the muzzle near a source of light the viewer will then observe a central spot of light due, of course, to the direct ray of light emanating from the muzzle plug aperture. In addition, and most importantly, he will observe a phenomenon due to diffraction of the light as it reflects from the highly polished interior surface of the gun barrel. The phenomenon consists of diffraction patterns in the form of generally concentric rings of light that are due to the interference of the various light rays reflected along the interior surface. If the barrel is perfectly straight and the muzzle opening and breech opening are exactly aligned, these rings seen by the viewer will be perfectly concentric and the width of each ring will be uniform around its circumference.

The number of rings observed will depend on several factors such as: focal length of the pinhole type lens formed by the aperture; length of barrel; diameter of barrel; and the degree of taper of inner surface of the barrel. For example, I have found that a certain popular brand of 12 gage shotgun having a moderate taper will produce three rings while another brand having a lesser taper will show seven rings.

If the barrel is bent, then one or more of the rings will appear to be uneven in width. The location of the wide and narrow portions of such light rings will be indicative of the location of points of distortion of the barrel and the relative width ratios will be indicative of the degree of distortion.

It should be noted that the rings of light produced by my unique muzzel plug will be evident even though the eye piece plug is not used in the breech opening. A skilled gunsmith can judge the straightness of a barrel in such instance by looking into the breach opening. However, I prefer that the eye piece plug be used by individuals not highly experienced in the art. The eye piece ensures that the viewer's eye is accurately held at the barrel center line.

Thus my novel invention provides a simple and accurate device so that by the use of which a relatively unskilled person can quickly judge the straightness and alignment of his gun barrel over its entire length. It is easily seen that my device is also useful during a straightening operation for determining when accurate alignment and straightness have in fact been achieved.

For example, while a barrel is clamped in a jig or other apparatus for straightening, my optical gage plugs can be left in place. The gunsmith can make frequent observation as he proceeds.

Therefore, it is a primary object of my invention to provide an optical collimation gage to allow even a relatively unskilled individual to measure the straightness and alignment of gun barrels, precision tubes and similar devices.

It is another object of my invention to provide a device for gaging the straightness and alignment of a gun barrel, tube, or the like during a straightening operation.

It is a further object of my invention to provide a device for use in adjusting the sights of a gun.

These and other objects, features and advantages of my invention will be more clearly seen by reference to the detailed description of my invention hereinbelow.

DESCRIPTION OF THIS INVENTION

Figure 1A:
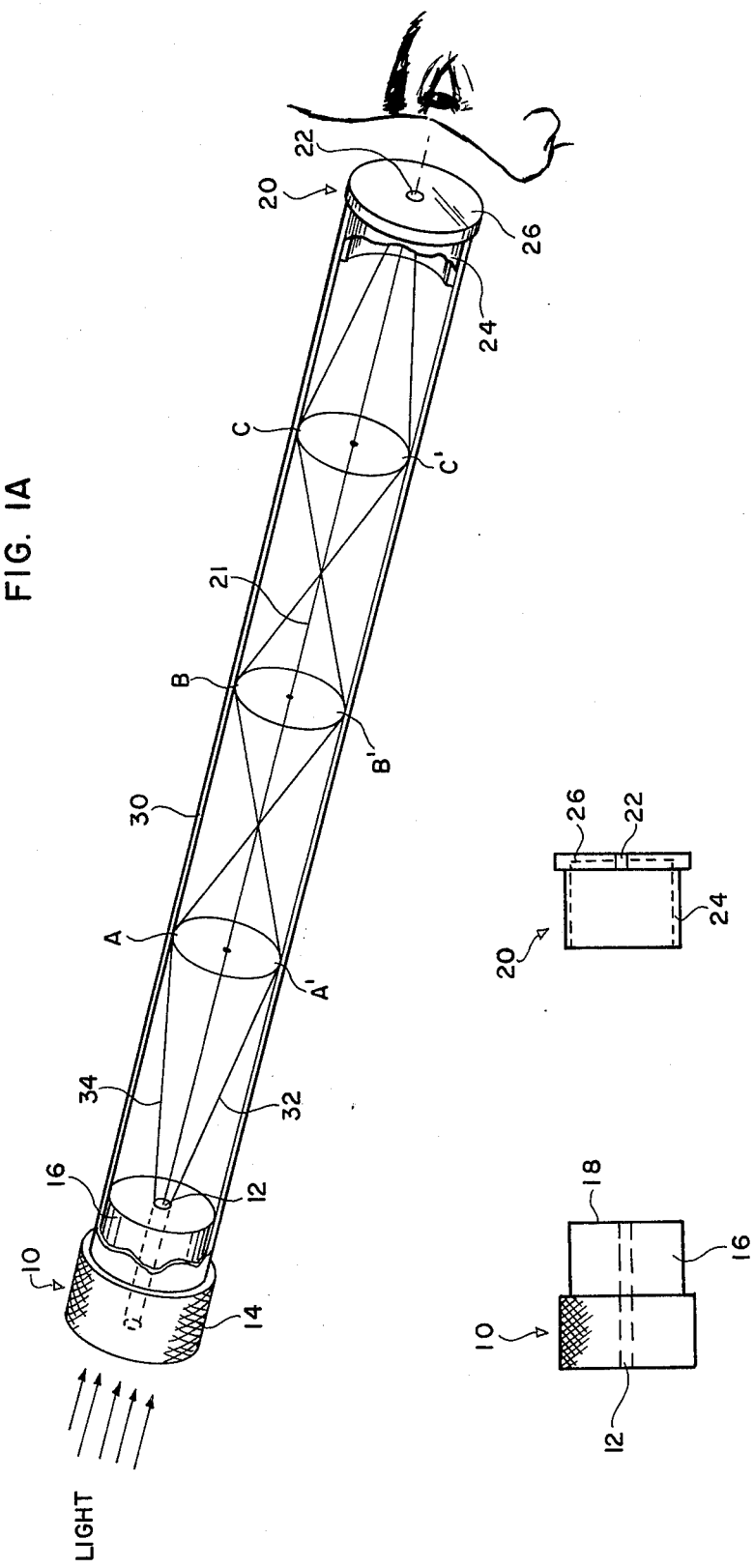
FIG. 1A is an exploded view of a typical gun barrel having my optical gage device in position and showing the formation of typical light ring patterns and FIG. 1B shows details of the muzzle and breech plugs.

Referring to FIG. 1A, an exploded view of a typical gun barrel is shown having one version of my optical gage device in position for operation. Muzzle plug 10 is shown in place in the muzzle of the barrel 30. Circular aperture hole 12 is disposed concentrically with the body 16 of the plug 10. The cylindrical body 16 is sized to fit snugly within the muzzle end of the barrel and may be inserted to the point where shoulder 14 rests against the outer end of the barrel. Plug 20 is inserted in the breech end as shown. Breech plug 20 consists of a cylindrical body 24 which as shown by the dotted lines is counterbored to form a thin shell-like member. A disk or shoulder 26 is attached to body 24. Body 24 is of appropriate size to fit snugly into the breech of the barrel such that the inner side of shoulder 26 is in contact with the outer edge of the breech. A small circular aperture hole 22 is shown in the exact center of disk 26 and is exactly concentric with body 24.

Figure 1B:
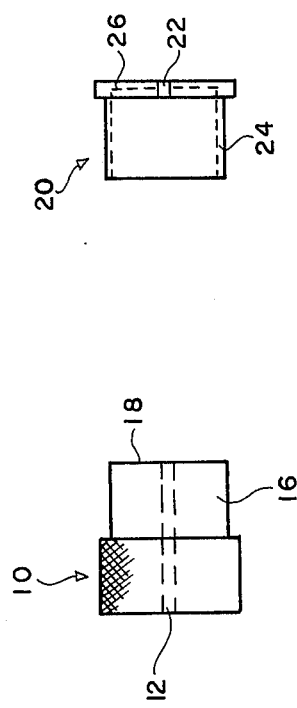

Details of construction of plugs 10 and 20 may be seen more clearly by referring to FIG. 1B. It is to be noted that this implementation of my gage requires that body 16 of plug 10 be accurately sized so as to properly fit the muzzle of a particular model gun or barrel. In a preferred embodiment described hereinafter, I show a muzzle plug that will adapt to variations in muzzle diameters.

The length of bodies 16 and 24 are not critical to the operation of my invention. It is only necessary that these bodies be short relative to the barrel length, yet long enough to form a firm fit in the barrel. An important aspect of plug 10 is that inner surface 18 be exactly at right angles to hole 12 to ensure a uniform source of light rays around the periphery of the inner end of hole 12.

As shown in FIG. 1A, light enters the aperture hole 12 of the muzzle plug. The size of aperture 12 is selected to produce clear, sharp interference rings as will be explained in more detail hereinafter.

An approximate theory and explanation of the formation of a set of rings seen by a viewer's eye when looking through aperture 22 of the breech or viewing plug is as follows:

Light incident on the outside end of plug 10 will enter aperture 12. Due to its small size, the light rays through the aperture will tend to be collimated. The light wave front due to the collimated rays emerge from the inner end of aperture 12. The inner edge of the hole, in accordance with optical principles, acts as a point source of light. A light ray 21 will obviously travel in a straight line from the apparent point source through the center line of the barrel 30 and will appear to the viewer as a small point of light. However, since the aperture 12 acts as a point source light rays also emanate therefrom in directions. As these light rays strike the inner surface of barrel 30 which is normally highly polished, reflection will take place as is well known with the angle of incidence equal to the angle of reflection. At a certain point, such as point A as shown for ray 34, the phase of light wave fronts will be reinforced so as to form a bright ring. Similarly when ray 34 is reflected at point A and again strikes the inside of barrel 30 at point B' another point of light reinforcement will occur. At points between A and B the wave fronts do not reinforce but tend to interfere and cancellation takes place. As ray 34 continues to be reflected down barrel 30 it will strike point C and form another ring at this point. Similarly ray 32 as shown, is reflected at complementary points A', B and C'. As will be understood there is a continuum of rays forming a cone shape of which rays 32 and 34 are discrete elements. Thus, to the viewer, bright rings of light are apparent at location A, B and C down the barrel. Due to the varying distances from the viewer's eye to each ring, the ring at location A will appear to be small, the ring at point B will appear to be intermediate in size and the ring at point C will appear to be large. These rings of light are considered to be diffraction rings since they arise from the alternate cancellation and reinforcement of light due to its wave characater, as is well known.

The phenomenon of the concentric ring image as seen by the viewer is utilized in accordance with my invention to judge the alignment and straightness of gun barrel 30. I have discovered experimentally that any deviation from alignment or straightness in gun barrel 30 will result in certain distortions of these ring patterns. I will illustrate this phenomenon with specific examples shown in FIGS. 2, 3 and 4.

Figure 2:
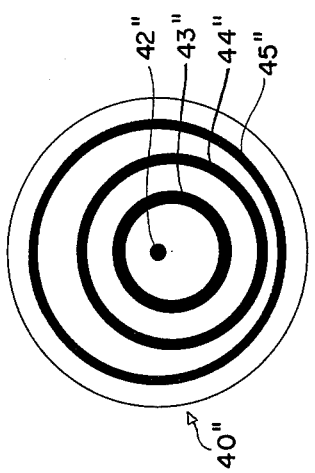
FIG. 2 is a representation of a typical light ring pattern as seen by an observer when the gun barrel is in good alignment and straight.

In FIG. 2 an exemplary set of rings is seen for a gun barrel in good alignment and straightness. Point 42 is formed by the ray of light 21 due to aperture 12 of FIG. 1. Similarly ring 43 represents the ring of light formed at point A, 44 the ring formed at point B and 45 the ring formed at point C. It may be noted that rings 43, 44 and 45 are exactly concentric with point 42. This indicates that the center of the breech opening in the barrel is in exact alignment with the center of the muzzle opening. Furthermore, the width of each ring of light 43, 44 and 45 is uniform aroudn the circumference of each ring. This situation indicates that the barrel is perfectly straight.

Figure 3:
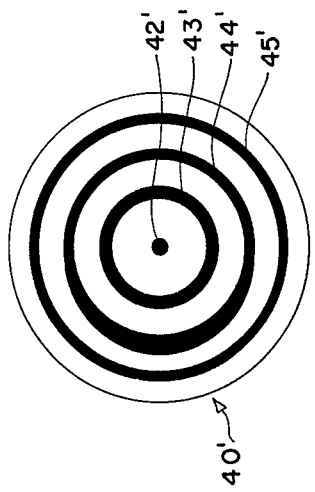
FIG. 3 is a typical ring pattern for a gun barrel that is bent slightly to the right, in the area of one of the light rings and has poor alignment.

Turning to FIG. 3, a typical ring image for a barrel that is slightly bent to the right is shown. In this example the point of bend is in the neighborhood of point B of barrel 30 shown in FIG. 1. In effect, this distortion of the barrel interferes with the reflection at this point causing a widening of the ring 44' on the left side as shown. Depending, of course, on the nature of the bend the other rings could also be affected, although not so shown in this illustration. The consequence to a user of a gun with this deficiency is a reduction in accuracy of his gun. I have found in some cases the effect of the pellets in a shotgun having a bent barrel will be to strike the barrel more on one side than the other. This action causes a slight displacement of the barrel and due to its normal elasticity will increase the normal flutter or dynamic vibration action at the free muzzle end. This effect distorts the pattern of the pellets and such distortion may be random to the point that even a skilled shooter may be unable to compensate.

Figure 4:
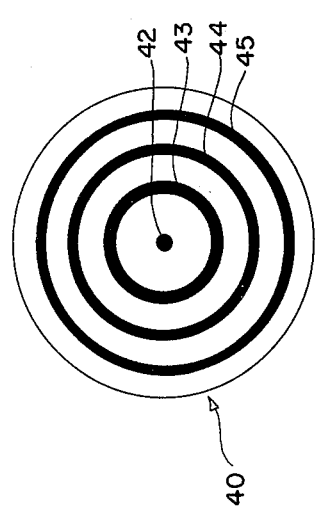
FIG. 4 shows a typical ring pattern for a gun barrel that is bent between the light rings and has poor vertical alignment.

Turning now to FIG. 4, a ring image is shown for a gun having barrel bent between rings of light 43" and 45". Rings of light 43" and 44" will not be concentric with point 42" or themselves. In this case the barrel has an upward bend.

Figure 5:
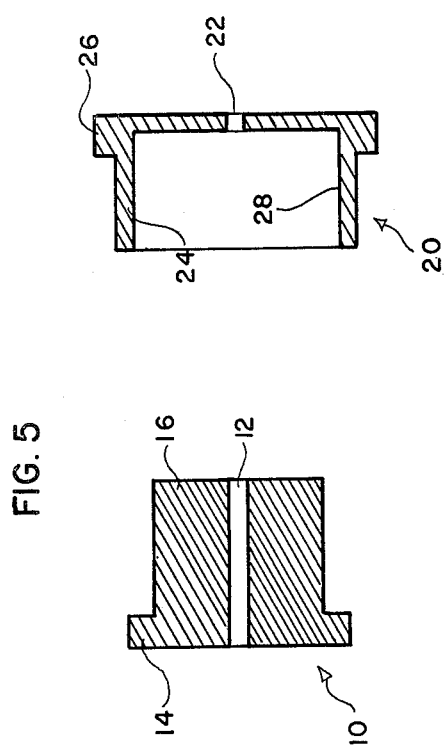
FIG. 5 is a cross sectional drawing of a set of my optical gage device elements showing typical construction.

Turning now to FIG. 5, details of the structure of one embodiment of my invention are shown in cross sectional view. Front plug 10 consists of a concentric body 16, a shoulder 14 connected to body 16, having aperture hole 12 longitudinally through shoulder 14 and body 16 and exactly concentric to these elements. In an exemplary embodiment for use with 12 gage shotguns, the preferred diameter of body 16 may be 0.7 inch, the diameter of shoulder 14 may be 0.75 inch and aperture hole 12 may have a diameter of 0.125 inch. However, it is apparent that these dimensions may be varied to fit a particular gun barrel as required. A critical element, however, is aperture hole 12. While I have indicated in this embodiment a diameter of 0.125 inch, this hole may be made smaller or larger if desired. A range of sizes from 0.09 to 0.18 has been found to be advantageous. If this opening is too large it no longer acts as a point source and distinct ring images are not obtained. On the other hand, if it is made too small it becomes difficult to obtain sufficient light intensity in the image rings. While other sizes of openings are operable, best results are obtained within the range described hereinabove. For large diameter barrels, a larger hole giving wider rings may be preferable. In general, I have found that the ratio of barrel diameter to aperture diameter in the range of 7:1 to 4:1 gives best results.

In FIG. 5, breech plug 20 that is utilized as an eye piece is shown. Plug 20 consists of a cylindrical body 24 having a concentric shoulder or disk 26 and the assembly 20 may be counterbored as shown by surface 28 to provide a thinned center portion of shoulder 26. Aperture hole 22 is concentric to body 24 and 26 as shown. Typical dimensions for the exemplary case being considered are as follows: The body 24 may be 0.375 inch in length and 0.805 inch in diameter. Should 26 may have a thickness of 0.062 inch and an outer dimension of 0.865 inch. The counterbore 28 may have an inside diameter of 0.625 inch and a depth of 0.428 inch. This generates a wall thickness for the center portion of shoulder 26 of 0.009 inch. Aperture hole 22 may be of a diameter of 0.062 inch. While I have stated certain dimensions for illustrative purposes it is to be understood that these dimensions may be varied as necessary to fit any particular gun barrel.

The basic purpose of breech plug 20 is to insure accurate alignment of the viewer's eye with the center line of the barrel. For this reason the diameter of hole 22 through which the viewer observes the ring pattern phenomenon must be small to prevent misalignment of the eye. Plug 20 can be of course machined from metal stock. However, as obvious to those skilled in the art, it can be fabricated from sheet metal similar to a shell casing, molded from plastic or by other well known methods.

Figure 6:
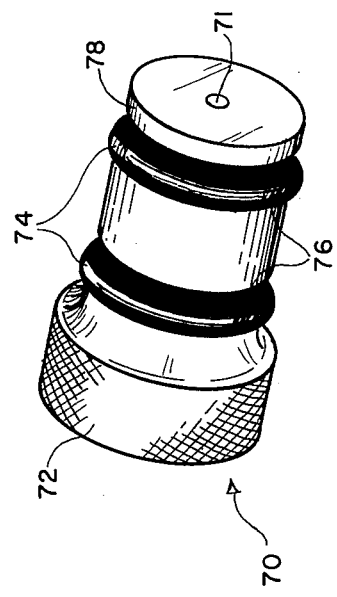
FIG. 6 shows a preferred type of muzzle plug that will adapt to differing muzzle diameters.

Turning now to FIG. 6, a preferred design of muzzle plug 10 is shown. Shotguns of a given gage vary in exact diameter of their muzzles. Also, in some shotguns a choke or narrowing of the muzzle end of the barrel is used. For such cases, I have advantageously provided modified muzzle plug 70. As shown, the cylindrical body 78 of a plug 70 has two grooves 76 turned therein. In use a snug fitting rubber O-ring 74 is pressed in each of such grooves. Knurled knob 72 is used to conveniently handle the plug. Plug 70 can then be inserted into muzzles of slightly varying size and chokes and the O-rings will insure accurate centering of the plug. Aperture 71 is of course the same as aperture 12 of plug 10 previously described.

Figure 7:
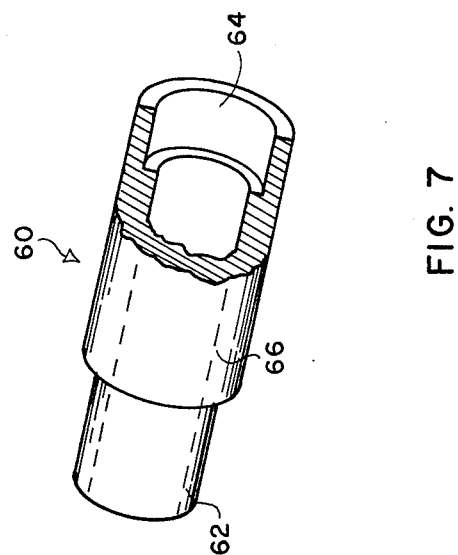
FIG. 7 illustrates a cutaway view of a viewing adapter for use with my optical gage apparatus for certain types of guns to be installed in the breech end of the barrel.

It is, of course, important for convenient use of my invention that the viewing plug be usable with various guns and without necessarily disassembling the guns to any great degree. In some guns there is insufficient clearance at the breach opening to insert the breech or viewing plug 20 because of the particular design. For such cases, I have provided an adapter unit 60 shown in cutaway view in FIG. 7. Adapter unit 60 is essentially a tubular member having on one end a plug body 62 which is of the exact diameter of body 24 of viewing plug 20. A concentric outer body 66 of greater diameter than plug body 62 forms a shoulder with plug body 62. At the other end of 66 of plug body 62 a counterbore 64 is provided. This counterbore 64 is concentric with body 62 and has an inside diameter sufficient to form a snug fit for body 24 of viewing plug 20. In use the plug end 62 of adapter is inserted in the breech of the gun barrel. The viewing plug 20 is then inserted in bore 64 in the outer end of adapter 60. The length of body 66 of adapter 60 is, of course, selected to insure that the viewing plug 20 is clear of any obstructions in the gun so that the viewer can place his eye in the proper position.

Having now described in detail the structure of my novel optical gage, I will now describe a preferred method of use of my invention. To determine the condition of a gun barrel the user selects a set of my gage plugs that match the inner diameters of his gun barrel. He inserts the muzzle plug firmly in place and if convenient inserts the viewing plug in the breech opening. If due, to the gun construction, it is not possible for the user to place his eye at the aperture hole of the breech or viewing plug, then a suitable adapter must be in- serted in the breech of the gun and the viewing plug inserted in the outer end of the adapter.

In either event the gun may be mounted on a stand with the muzzle end pointed at a source of light. The user then places his eye at the center of the breech plug in such position that he can see the center point of light and the ring images discussed above. The user then carefully notes the concentricity of the ring images and the relative thicknesses of the rings. Where departures from the ideal case are noted the user then notes the location and type of defect.

Where it is desired to straighten or otherwise correct distortions in gun barrels, my optical gages may be inserted and left in place, and advantageously be used to check progress as various operations are performed.

Figure 8:
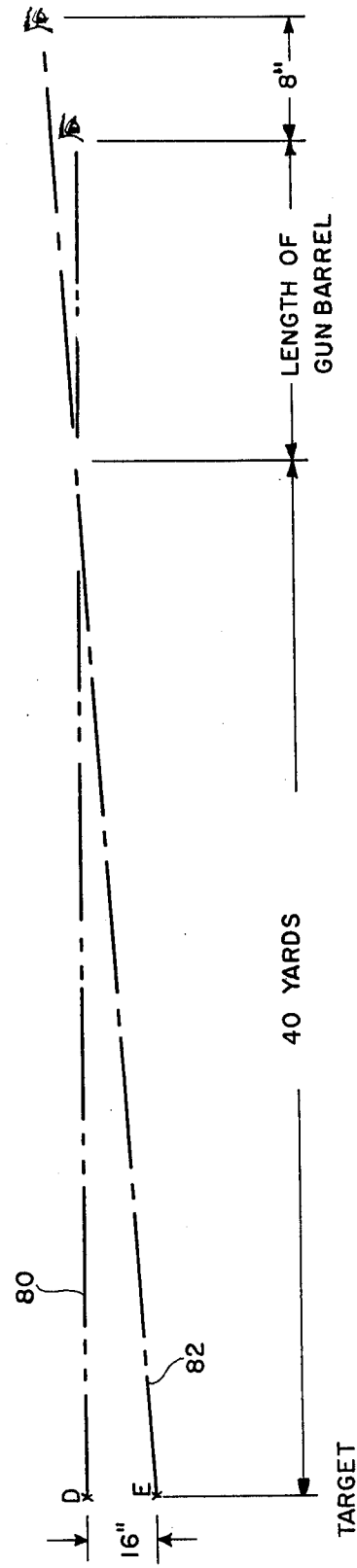
FIG. 8 relates to a method of determining proper sight adjustment using my optical gage device.

Although the primary use of my invention is for gaging the quality of a gun barrel, it may also be used as an aid in aligning a set of gun sights. Referring to FIG. 8, the method by which this may be accomplished is shown. With my optical gage installed on the gun, the gun is clamped in a vise or stand and a target placed at a desired distance, which may be for example 40 yards. By sighting now through the small apertures formed by my device the point on the target in a direct line 80 to the center line of the barrel may be noted. This point is shown at D in FIG. 8. Now, by placing the eye several inches from the viewing plug and looking down the normal gun sights the point on the target at which the sights are set can be determined. This is indicated as point E in FIG. 8. In the example shown distance from point D to point E is indicated as 16 inches. With a knowledge of the velocity of the shot, the amount of drop of the shot from the muzzle to the target can be calculated. For the example shown this might be 4 inches. From this information the amount of misalignment of the sights can be determined. In this example the line of sight will cause the gun to shoot 16 inches high minus 4 inches drop or 12 inches high. The sights can therefore be realigned to correct such error.

In the embodiments of my invention shown hereinabove, I have used plug designs that are conveniently inserted in the barrel ends, and therefore must have sufficient length to be stable when so inserted. However, it is within the scope and spirit of my invention to use any type of opaque material attached or held in close contact with the muzzle having the required small aperture on the barrel center line, and a similar construction for the breech end. For example, a thin metal cap that may be slipped snugly over the muzzle end of a barrel is an obvious construction. Other variations will be obvious to one skilled in the art and will fall within the scope of my invention.

Also, I have shown in the embodiments of my invention disclosed hereinabove that the aperture hole in the muzzle plug is preferably circular. This form of aperture is generally easy to fabricate. However, I have found that even an irregularly shaped hole will produce the unique light ring phenomenon described hereinabove. Therefore, I am not to be limited to a circular aperture only.

My invention is also applicable to other types of gun barrels, such as rifles, artillery pieces, and the like. The ring phenomenon I utilize in my invention will be formed for barrels or tubes of all sizes and it is only necessary to optimize the optical gage aperture sizes in accordance with the above teachings.

I claim:

1. An optical gaging device for visually determining the degree and location of misalignments of barrels of shotguns, rifles and similar devices comprising means mountable to one end of such barrel including means for producing images consisting of a central point of light and a multiplicity of rings of light transverse to and along the inner surface of such barrel whereby the degree of eccentricity of such rings with such point of light and the relative widths of such rings around their circumferences are indicative of the degree and location of misalignments of such barrel.

2. The device as claimed in claim 1 in which said means for producing images comprises opaque material arranged to cover such end of such barrel, said opaque material having a small hole through said material, said hole located to be on an exact line with the center line of such barrel, said hole having a size sufficiently small so as to cause light falling on the outside surface of said opaque material to emanate from the hole inside of such barrel in the general manner as light from a point source.

3. A device for visually determining the degree and location of misalignments of barrels of shotguns, rifles and similar devices comprising means mountable to one end of such barrel, said means including means for producing an essentially point source of light as the center of such barrel end, whereby such point source of light produces images consisting of a central point of light and multiplicity of rings of light transverse to and along the inner surface of such barrel.

4. The device as defined in claim 3 in which said means for producing an essentially point source of light comprises a plug having a generally cylindrical body whose effective outside diameter is selected to produce a snug fit when inserted in one end of such barrel, said plug having a small hole longitudinally through its length and centered within said body wherein the size of said hole is sufficiently small to cause the inner opening of said hole to act as a point source of light when light is incident on the outer opening of said hole.

5. The device as defined in claim 3 in which said means for producing an essentially point source of light comprises a plug having a generally cylindrical body, said body being slightly smaller in diameter than the inner diameter of such barrel, said body having at least two annular grooves around the outside surface of said body, and O-rings formed of a resilient compressible material, said O-rings seated snugly in said grooves, the depth of said grooves allowing the outside diameter of said O-rings to project above the surface of said body, such outside diameter of said O-rings being selected to be slightly larger than the inner diameter of such barrel end whereby said plug is self-centering when inserted into such barrel end, and whereby said plug will fit ends of barrels having inner diameters falling within a selected range, said plug having a small circular hole longitudinally along its length and concentric with said body wherein the size of said hole is sufficiently small to cause the inner opening of said hole to act as a point source of light when light is incident on the outer opening of said hole.

6. The device as defined in claim 4 in which said hole is circular and concentric with said body.

7. The device as defined in claim 6 for use with a shotgun barrel in which the diameter of said circular hole falls within the range of 0.09 inches to 0.18 inches.

8. The device as defined in claim 6 in which the ratio of the diameter of said circular hole to the diameter of said cylindrical body is in the range of 1:4 to 1:7.

9. An optical gaging device for visually determining the degree and location of misalignments of barrels of shotguns, rifles and similar devices comprising means mountable to one end of such barrel including means for producing an essentially point source of light at the approximate center of such barrel end, whereby such point source of light produces images consisting of a central point of light and a multiplicity of rings of light transverse to and along the inner surface of such barrel in combination with viewing means mountable to the opposite end of the barrel, said viewing means serving to guide the eye of a viewer to be accurately aligned with the center line of such barrel.

10. The device as defined in claim 9 in which said means for producing a point source of light comprises a first plug having a cylindrical body whose outside diameter is selected to produce a snug fit when inserted in one end of such barrel, said plug having a small circular hole longitudinally through its length and concentric with said body wherein the size of said hole is sufficiently small to cause the inner opening of said hole to act as a point source of light when light is incident on the outer opening of said hole, and said viewing means comprising a second plug having a tube-like cylindrical body whose outside diameter is selected to produce a snug fit when inserted in such opposite end of such barrel, said second plug having a thin-wall cap at its outer end, said cap having a small circular hole concentric with said second plug body wherein the size of said hole is selected to afford the viewer a view of the entire inside length of such barrel.

11. The device as defined in claim 9 in which said means for producing an essentially point source of light comprises a plug having a generally cylindrical body, said body being slightly smaller in diameter than the inner diameter of such barrel, said body having at least two annular grooves around the outside surface of said body, and O-rings formed of a resilient compressible material, said O-rings seated snugly in said grooves, the depth of said grooves allowing the outside diameter of said O-rings to project above the surface of said body, such outside diameter of said O-rings being selected to be slightly larger than the inner diameter of such barrel end whereby said plug is self-centering when inserted into such barrel end, and whereby said plug will fit ends of barrels having inner diameters falling within a selected range, said plug having a small circular hole longitudinally along its length and concentric with said body wherein the size of said hole is sufficiently small to cause the inner opening of said hole to act as a point source of light when light is incident on the outer opening of said hole, and said viewing means comprising a second plug having a tube-like cylindrical body whose outside diameter is selected to produce a snug fit when inserted in such opposite end of such barrel, said second plug having a thin-wall cap at its outer end, said cap having a small circular hole concentric with said second plug body wherein the size of said hole is selected to afford the viewer a view of the entire inside length of such barrel.

12. The method of determining the degree and location of misalignments of shotgun barrels, rifle barrels, tubes, and similar devices comprising the steps of attaching an optical gage to one end of the barrel, the gage allowing light to enter the barrel only via a small hole in the gage on a line with the center line of the barrel wherein light emanates from the inner side of the hole essentially as light from a point source, and forms a multiplicity of rings of light transverse to and distributed along the inner surface of the barrel, holding the barrel to allow light to enter the barrel through the small hole thereby forming the rings of light, placing the eye at the other end of the barrel so as to have the spot of light formed by direct rays of light emanating from the small hole to be in the center of the field of view, observing the spot of light surrounded by the multiplicity of light rings which will appear of different sizes as a function of their distances from the eye, judging the degree of eccentricity of the light rings with respect to the spot of light and each other, and the variations of widths of the light rings around their circumferences, and interpreting such eccentricity and variations in widths to determine the degree and locations of misalignments.

\* \* \* \* \*